US012810381B2

(12) United States Patent
Yu et al.

(10) Patent No.: US 12,810,381 B2
(45) Date of Patent: Nov. 24, 2026

(54) COORDINATE-BASED SELF-SUPERVISION FOR BURST DEMOSAICING AND DENOISING

(71) Applicant: SAMSUNG ELECTRONICS CO., LTD., Suwon-si (KR)

(72) Inventors: Jason J. Yu, Toronto (CA); Marcus A. Brubaker, Toronto (CA); Konstantinos G. Derpanis, Toronto (CA); Aleksai Levinshtein, Thornhill (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 238 days.

(21) Appl. No.: 18/646,032

(22) Filed: Apr. 25, 2024

(65) Prior Publication Data

US 2025/0078201 A1 Mar. 6, 2025

Related U.S. Application Data

(60) Provisional application No. 63/536,833, filed on Sep. 6, 2023.

(51) Int. Cl.

| | |
|---|---|
| ***G06T 3/4007*** | (2024.01) |
| ***G06T 3/4038*** | (2024.01) |
| ***G06T 3/4046*** | (2024.01) |

(52) U.S. Cl.

CPC .......... *G06T 3/4007* (2013.01); *G06T 3/4038* (2013.01); *G06T 3/4046* (2013.01)

(58) Field of Classification Search

CPC ... G06T 3/4007; G06T 3/4038; G06T 3/4046; G06T 2207/20081; G06T 2207/20084; G06T 5/50; G06T 3/4015; G06T 5/60; G06T 5/70

See application file for complete search history.

(56) References Cited

U.S. PATENT DOCUMENTS

| | | | | |
|---|---|---|---|---|
| 2013/0293547 | A1* | 11/2013 | Du | H04N 13/111 345/426 |
| 2019/0068973 | A1* | 2/2019 | Hamilton | G06T 3/18 |
| 2019/0295282 | A1* | 9/2019 | Smolyanskiy | G01S 13/862 |
| 2022/0086342 | A1* | 3/2022 | Hada | G06T 1/60 |
| 2023/0115821 | A1 | 4/2023 | Jannard et al. | |
| 2024/0135496 | A1* | 4/2024 | Dudhane | G06T 5/50 |
| 2025/0386099 | A1* | 12/2025 | Lablans | H04N 23/45 |

FOREIGN PATENT DOCUMENTS

| | | |
|---|---|---|
| JP | 6274744 B2 | 2/2018 |

* cited by examiner

*Primary Examiner* — Iriana Cruz

(74) *Attorney, Agent, or Firm* — Sughrue Mion, PLLC

(57) ABSTRACT

Disclosed are an electronic device and a method including obtaining a plurality of images using an image sensor of the electronic device, obtaining synthetic training data for pre-training a burst processing network, performing implicit interpolation on the obtained plurality of images based on the pre-trained burst processing network, combining the plurality of images into a target image based on the implicit interpolation, and outputting the target image to a display of the electronic device.

17 Claims, 10 Drawing Sheets

COORDINATE-BASED SELF-SUPERVISION FOR BURST DEMOSAICING AND DENOISING

CROSS-REFERENCE TO RELATED APPLICATION

This application claims priority to U.S. provisional application No. 63/536,833 filed on Sep. 6, 2023, the entire contents of which are incorporated herein by reference.

BACKGROUND

1. Field

This disclosure relates to methods and devices for providing coordinate-based single-camera self-supervision and/or multi-camera supervision for burst demosaicing and denoising.

2. Related Art

Demosaicing and denoising may be used to obtain high quality color images from related art cameras. Multi-frame approaches may leverage image bursts to provide improved quality over single frame methods. Training models in a supervised manner may be challenging as paired data may be difficult to obtain. Self-supervised methods can directly leverage bursts to avoid the difficulty of capturing paired data by formulating a reconstruction task with a held out target frame. However, this may rely on standard interpolation methods to align grid-based model outputs with the target frame, which are bandlimited, and may cause undesired artifacts in the output. In supervised multi-camera setups, a mobile phone camera is paired with a high quality DSLR/mirrorless camera capturing the same object from a slightly different view point. This high-quality image serves as a target for the enhancing the mobile camera image, but needs to be first aligned spatially and in color to the mobile phone image.

Due to a small sensor size on mobile phone cameras, many mobile photography modes use burst photography. In burst photography, many images are captured in quick succession (e.g., a burst) and are automatically combined together into a single enhanced image. This technology may be used for low-light photography, digital zoom, and other applications. Additionally, deep learning solutions may be used for image enhancement, including for burst photography. However, it may be difficult to obtain paired training data for burst photography training. The data may need to contain realistic handheld bursts and an aligned target image.

SUMMARY

One or more embodiments of the present application address the above and/or other aspects of demosaicing and denoising by modifying a burst model to output a coordinate-based image representation using single-camera self-supervision and/or multi-camera supervision, which enables a model to learn improved interpolation that interpolates a target image in burst processing network training using implicit interpolation, resulting in improved network output and a reduction in artifacts arising from explicit interpolation.

According to one or more embodiments, a method performed by at least one processor, includes obtaining a plurality of images using an image sensor of the electronic device; obtaining synthetic training data for pre-training a burst processing network; performing implicit interpolation on the obtained plurality of images based on the pre-trained burst processing network; combining the plurality of images into a target image based on the implicit interpolation; and outputting the target image to a display of the electronic device.

According to one or more embodiments, an electronic device including: an image sensor; a display; a memory configured to store instructions; and at least one processor configured to execute the instructions to cause the electronic device to: obtain a plurality of images using the image sensor of the electronic device; obtain synthetic training data for pre-training a burst processing network; perform implicit interpolation on the obtained plurality of images based on the pre-trained burst processing network; combine the plurality of images into a target image based on the implicit interpolation; and output the target image to the display of the electronic device.

According to one or more embodiments, a non-transitory computer readable medium having instructions stored therein, which when executed by a processor cause the processor to execute a method including: obtaining a plurality of images using an image sensor of an electronic device; obtaining synthetic training data for pre-training a burst processing network; performing implicit interpolation on the obtained plurality of images based on the pre-trained burst processing network; combining the plurality of images into a target image based on the implicit interpolation; and outputting the target image to a display of the electronic device.

BRIEF DESCRIPTION OF DRAWINGS

Further features, the nature, and various aspects of the disclosed subject matter will be more apparent from the following detailed description and the accompanying drawings in which.

DETAILED DESCRIPTION

Figure 1A:
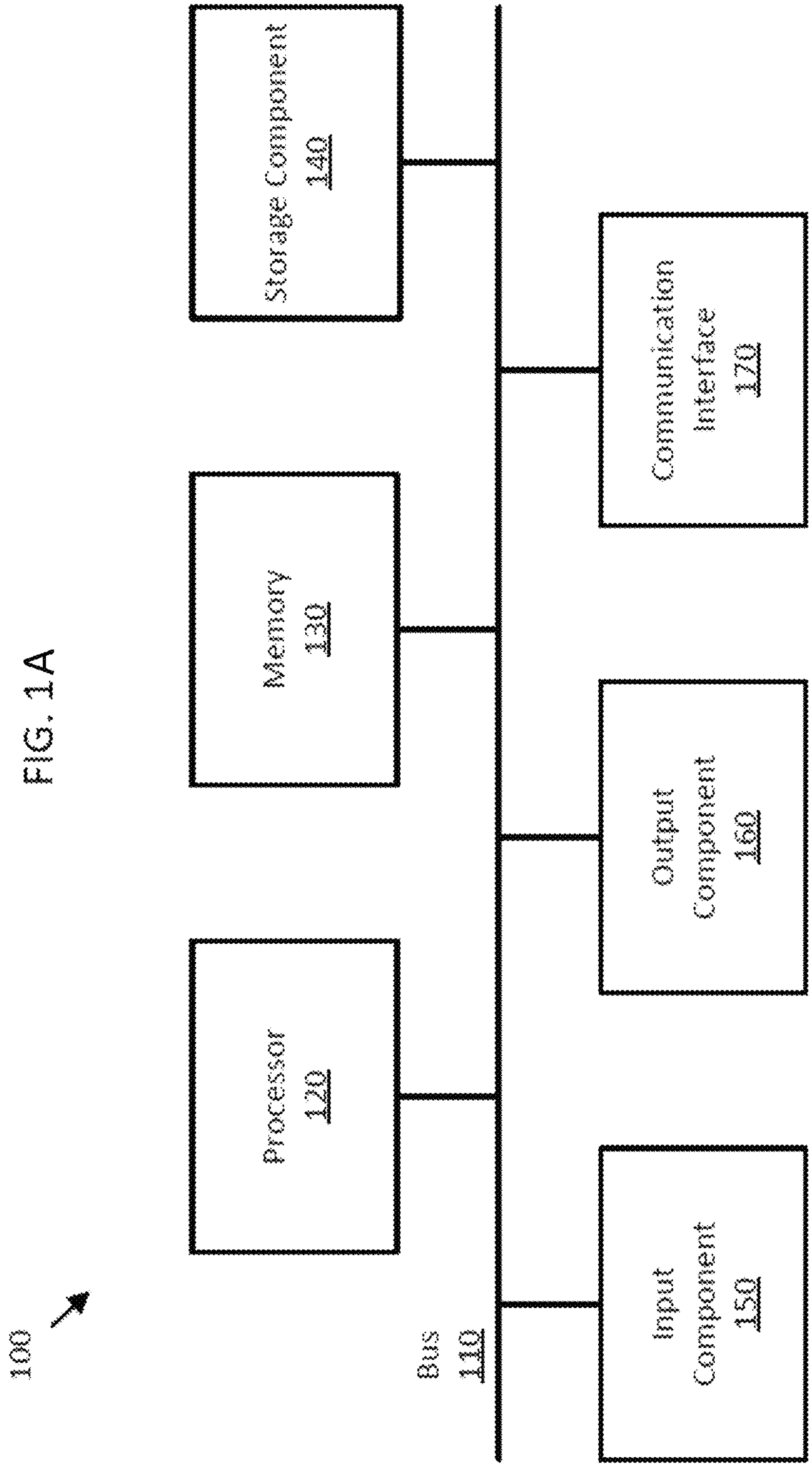
FIG. 1A is a block diagram of example components of one or more devices, according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware or firmware. The actual specialized control hardware used to implement these systems and/or methods is not limiting of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, aspects, and characteristics of the present disclosure may be combined in any suitable manner in one or more embodiments. One skilled in the relevant art will recognize, in light of the description herein, that the present disclosure may be practiced without one or more of the specific features or aspects of a particular embodiment. In other instances, additional features and aspects may be recognized in certain embodiments that may not be present in all embodiments of the present disclosure.

Demosaicing may refer to a process in digital photography and digital image processing where the colors of a digital image are reconstructed from image sensor data. According to one or more embodiments, demosaicing refers to the task of reconstructing full color images from sensors that use color filter arrays (CFAs), which may be a Bayer filter. The image sensors may spatially subsample multiple color channels. A Bayer pattern may be used, which spatially tiles a 2×2 red-green-green-blue (RGGB) pattern over a sensor. To obtain a full RGB image, demosaicing methods may be used to interpolate the remaining two thirds of the image from the available observations. Related art methods have relied on learned image priors to address an issue of demosaicing from a single image. Multi-frame methods may leverage bursts of frames to reconstruct images with higher quality than possible with single-frame methods. Bursts may be captured using handheld devices, and the frames may differ by non-integer pixel displacements caused by the user. These misalignments allow each frame to provide color samples in regions that are missed by the other frames in the burst. Given that the alignments between the frames can be estimated, bursts can provide an additional signal to achieve accurate reconstructions of a full color image.

According to one or more embodiments, learning based methods for demosaicing can be trained with full supervision, but may rely on access to paired data with demosaiced ground truth images. Synthetic data may limit the generalization of models to real images. Related art camera sensors rely on CFAs, which may not provide the demosaiced images. Multi-camera datasets are simpler to obtain, but supervised multi-camera training may need to address spatial misalignments and color space mismatches between the cameras. These differences between the ground truth and the burst should be accounted for during training using spatial and color alignment methods, but may leak information about the camera used to capture the ground truth into the model.

According to one or more embodiments, a learning model may learn images that are misaligned with the reference frame, and may have different colors than the sensor used to capture the burst. Self-supervised approaches for demosaicing and denoising may rely only on noisy raw bursts which are easy to capture. Additionally, the model produces images in the same color space as the inputs, and can jointly perform denoising under certain statistical assumptions. This may be formulated as a reconstruction task of a held out target frame from the burst which may require alignment. Because the aligned pixel positions of the model output often do not lie directly on the pixel grid of the target frame, interpolation methods are employed to obtain sub-pixel color values, according to one or more embodiments. However, interpolation methods may introduce artifacts into the reconstructions due to the bandlimited nature of grid based images.

A description of example embodiments is provided on the following pages. The text and figures are provided solely as examples to aid the reader in understanding the invention. They are not intended and are not to be construed as limiting the scope of this invention in any manner. Although embodiments and examples have been provided, it will be apparent to those skilled in the art based on the disclosures herein that changes in the embodiments and examples shown may be made without departing from the scope of this invention.

FIG. 1A is a block diagram of example components of one or more devices, according to an embodiment. The device 100 may correspond to a user device, a TV, a wall panel, etc. As shown in FIG. 1A, the device 100 may include a bus 110, a processor 120, a memory 130, a storage component 140, an input component 150, an output component 160, and a communication interface 170.

The device 100 may be a smart phone, tablet, laptop, personal computer, etc. For example, embodiments may include a smart phone capable of capturing images. The device 100 may be smart glasses, and/or augmented and virtual reality (AR/VR) headsets (having a camera).

The bus 110 includes a component that permits communication among the components of the device 100. The processor 120 is implemented in hardware, firmware, or a combination of hardware and software. The processor 120 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 120 includes one or more processors capable of being programmed to perform a function. The memory 130 includes a random access memory (RAM), a read only memory (ROM), and/or another type of dynamic or static storage device (e.g., a flash memory, a magnetic memory, and/or an optical memory) that stores information and/or instructions for use by the processor 120.

The storage component 140 stores information and/or software related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 150 includes a component that permits the device 100 to receive information, such as via user input (e.g., a touch screen display, a keyboard, a keypad, a mouse, a button, a switch, and/or a microphone). Additionally, or alternatively, the input component 150 may include a sensor for sensing information (e.g., a global positioning system (GPS) component, an accelerometer, a gyroscope, and/or an actuator). The output component 160 includes a component that provides output information from the device 100 (e.g., a display, a speaker, and/or one or more light-emitting diodes (LEDs)).

The communication interface 170 includes a transceiver-like component (e.g., a transceiver and/or a separate receiver and transmitter) that enables the device 100 to communicate with other devices, such as via a wired connection, a wireless connection, or a combination of wired and wireless connections. The communication interface 170 may permit the device 100 to receive information from another device and/or provide information to another device. For example, the communication interface 170 may include an Ethernet interface, an optical interface, a coaxial interface, an infrared interface, a radio frequency (RF) interface, a universal serial bus (USB) interface, a Wi-Fi interface, a cellular network interface, or the like.

The device 100 may perform one or more processes described herein. The device 100 may perform these processes in response to the processor 120 executing software instructions stored by a non-transitory computer-readable medium, such as the memory 130 and/or the storage component 140. A computer-readable medium is defined herein as a non-transitory memory device. A memory device includes memory space within a single physical storage device or memory space spread across multiple physical storage devices.

Software instructions may be read into the memory 130 and/or the storage component 140 from another computer-readable medium or from another device via the communication interface 170. When executed, software instructions stored in the memory 130 and/or the storage component 140 may cause the processor 120 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 1 are provided as an example. In practice, the device 100 may include additional components, fewer components, different components, or differently arranged components than those shown in FIG. 1. Additionally, or alternatively, a set of components (e.g., one or more components) of the device 100 may perform one or more functions described as being performed by another set of components of the device 100.

FIGS. 1B to 1E illustrate an example of an optimization-based reconstruction of the unwarped image using different interpolators, according to one or more embodiments.

Figure 1E:
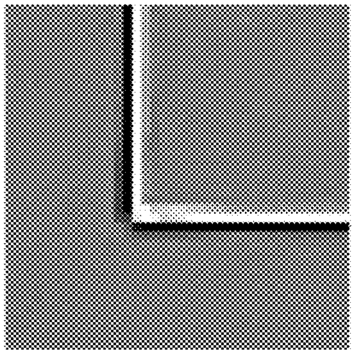
FIGS. 1B to 1E illustrate an example of an optimization-based reconstruction of the unwarped image using different interpolators, according to one or more embodiments.
Figure 1D:
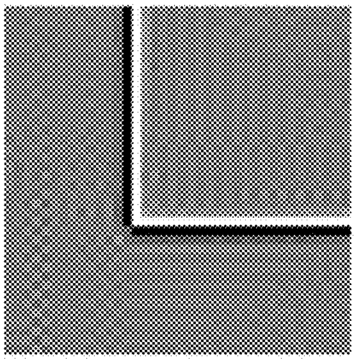
Figure 1C:
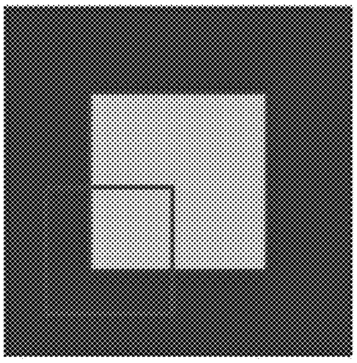
Figure 1B:
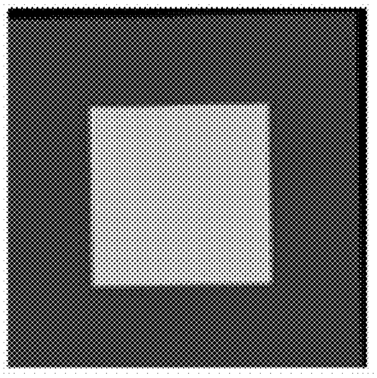

As illustrated in FIGS. 1B to 1E, an unwarped image may be recovered from a given warped image using different interpolation methods, image representations, and a known alignment. FIG. 1B illustrates an example of a warped image. FIG. 1C illustrates an example of an unwarped reconstructed image that is reconstructed using interpolation methods of reconstruction, e.g. bilinear interpolation or coordinate-based reconstruction. The box in FIG. 1C indicates the zoomed in region shown in the Laplacian visualizations of FIGS. 1D and 1E.

As illustrated in FIG. 1D, the Laplacian of the reconstruction using bilinear interpolation may contain artifacts. Bilinear reconstruction may be performed by minimizing the reconstruction error of a related art grid based image initialized with Gaussian noise, warped with bilinear interpolation.

FIG. 1E illustrates a Laplacian of a coordinate-based reconstruction. The coordinate-based reconstruction represents the images as a mapping between continuous pixel coordinates, and color values. Similar to the bilinear reconstruction method, the coordinate-based reconstruction also minimizes a warped reconstruction error, using the continuous nature of the coordinate-based model for representation and interpolation. A coordinate-based reconstruction may contain fewer artifacts than a reconstruction performed with bilinear interpolation. When inspecting the images that have been aligned with the warped observation using their respective interpolators, the artifacts present in the reconstructions may not be visible.

Figure 2:
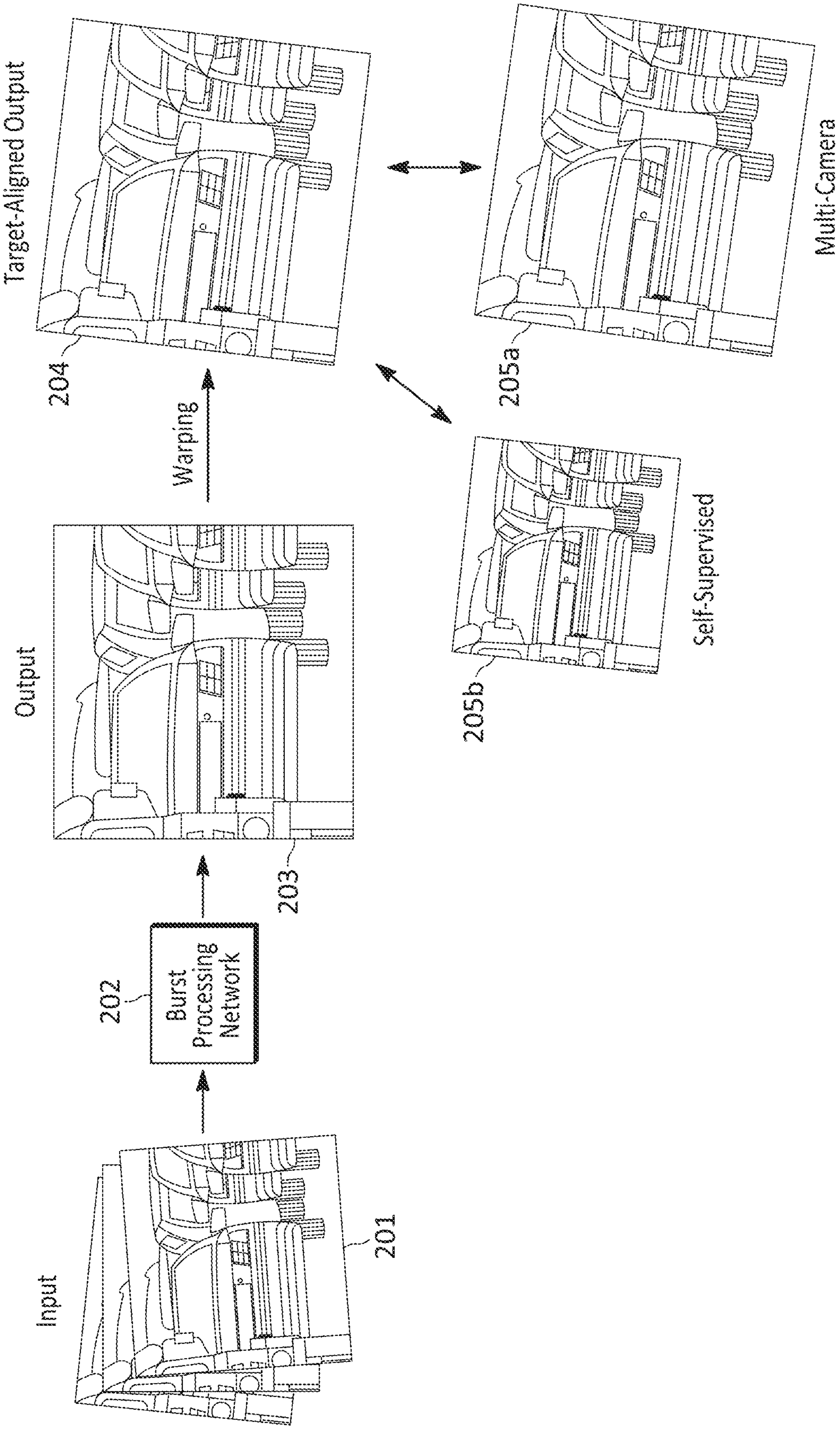
FIG. 2 illustrates one or more methods for training a burst processing network, according to one or more embodiments.

FIG. 2 illustrates one or more methods for training a burst processing network, according to one or more embodiments. To train burst photography on real data, the output should be aligned to a target prior to loss computation during training. It should be aligned because the target is either a high quality image from a different camera or a held out frame from a hand-held burst. In either case, none of the images from the input burst, and therefore the model output, is aligned to the target. According to one or more embodiments, methods for obtaining data to obtain realistic handheld bursts and an aligned target image may include relying entirely on synthetic data. However, synthetic data might not reliably model the characteristics of real bursts.

As illustrated in FIG. 2, input images 201 are provided to a burst processing network 202. If using a self-supervised training method, the input images include a burst of images from a single camera, with a held out frame. In self-supervised training, a burst is taken by a single camera, and one frame is held out from the burst of images for supervision. If a burst includes N frames, then N−1 frames may be input to a burst processing network 202 and one frame is held out for supervision. Although the frame is noisy, it may be useful because noise is random. A self-supervised training method may include pretraining on synthetic paired data and finetuned on real bursts without ground truth.

Another method is to use a pair of cameras (e.g., multi-camera supervised training method) with one capturing the handheld burst and the other capturing the high quality target. Although it may be easier to put a single camera on a tripod, using a single camera may yield a non realistic burst as the camera is not moving as it does in a handheld burst. The multi-camera supervised method may include training burst photography using a multi-camera method.

As illustrated in FIG. 2, according to an embodiment, the burst processing network 202 outputs an image 203. The image 203 output from the burst processing network 202 may be misaligned. In operation 204, the output image 203 is aligned to the corresponding target. The aligning of the output image may produce warping effects. After warping from explicit interpolation yields a blurrier image, the blurry image is compared to a sharp target image. In order to make the images match, the network output is pushed to be over-sharpened such that after blurring the result looks normal.

At operations 205*a* and 205*b*, the training may be provided in a supervised manner with multiple cameras (e.g., 205*a*) or a self-supervised manner with a single camera (e.g., 205*b*), according to one or more embodiments.

Iin a multi-camera supervised setting of operation 205*a*, one camera will capture a burst of images, and a second camera will capture a single high-quality image. Under this setting, the first camera and the second camera will be capturing the scene from slightly different angles. To produce a quality final image, the image should be aligned to the high-quality image captured by the second camera.

According to another embodiment, a self-supervised setting of operation 205*b* may be used. A self-supervised setting may be used for denoising. In self-supervised training, a burst is taken by a single camera, and one frame is held out from the burst of images for supervision. If a burst includes N frames, then N−1 frames may be input to a burst processing network 202 and one frame is held out for supervision. Although the frame is noisy, it is useful because noise is random.

According to one or more embodiments, the self-supervised method and the multi-camera method may require an alignment of the generated image from the network to the target image (e.g., ground truth from another camera in multi-camera scenario or a held-out frame from the burst in self-supervised scenario).

Figure 3:
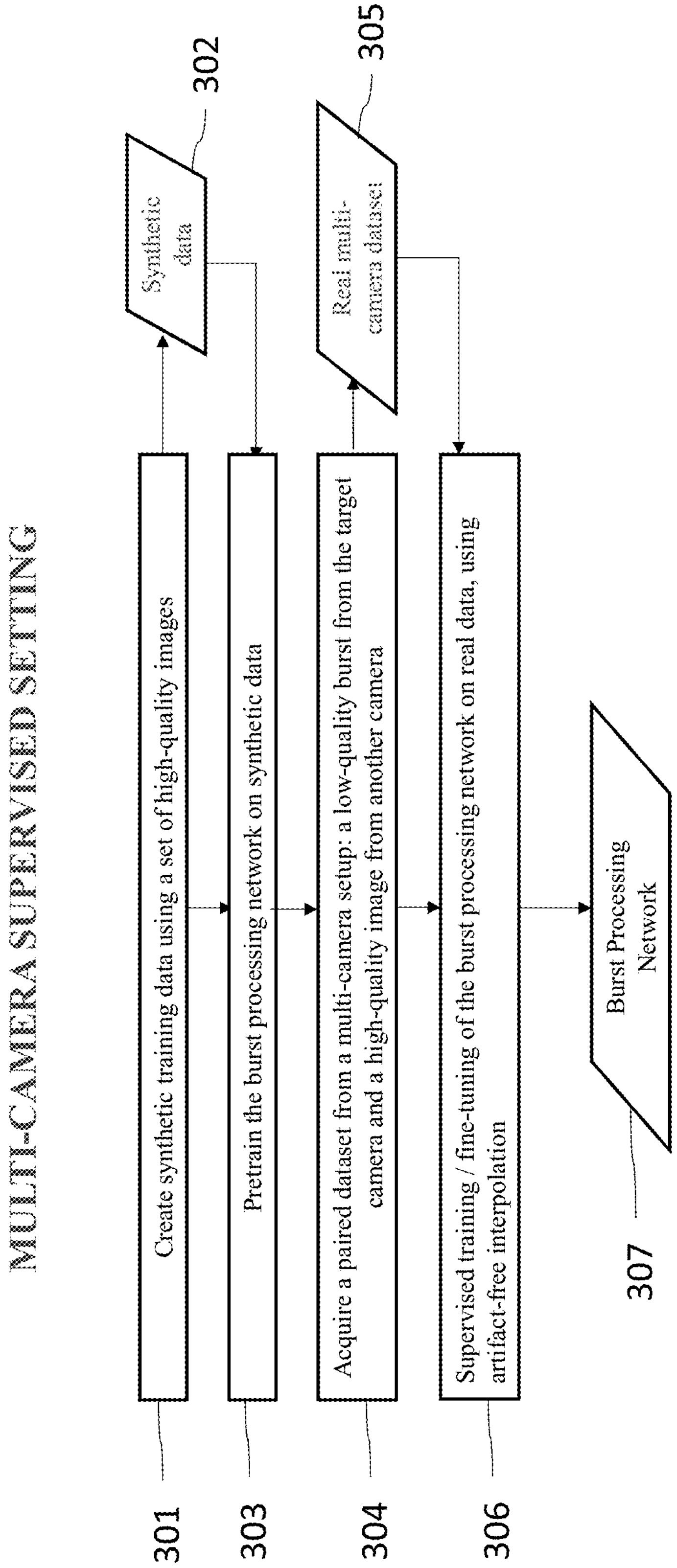
FIG. 3 illustrates an example method of training a burst processing network using a multi-camera supervised setting, according to one or more embodiments.

FIG. 3 illustrates an example method of training a burst processing network using a multi-camera supervised setting, according to an embodiment. When multi-camera data is used for supervised finetuning, spatial color alignment (SCA) should be performed during training and evaluation due to spatial and color mismatches between the sensors of the input burst, and the ground truth. Spatial alignment is performed by estimating the optical flow between the model output with the ground truth image using an optical flow estimation method, and warping the output to the ground truth using bilinear interpolation. When using a coordinate-based model, its learned interpolation can be used by querying a reference frame align image, computing the alignment flow with it and the ground truth image, and querying a ground truth aligned image using the estimated flow. Color alignment may be performed identically for all model types, by assuming color differences between the model output and the ground truth can be resolved using an estimated global 3×3 color correction matrix (CCM), per image. The CCM may be estimated by minimizing the least square error between aligned and smoothed versions of the input reference frame, and the ground truth. Color alignment can be skipped if it is useful for the final model to output the image in the same color space as the ground truth camera.

At operation 301, the method includes creating synthetic training data using a set of high-quality images. At operation 303, the method includes providing synthetic data (e.g., 302) to the burst processing network to pretrain the burst processing network. At operation 304, the method includes acquiring a paired dataset from a multi-camera setup: a low-quality burst from the target camera and a high-quality image from another camera. At operation 305, the method includes providing a real multi-camera dataset to the burst processing network. At operation 306, the method includes performing supervised training and fine-tuning of the burst processing network using real data and artifact-free interpolation (e.g., implicit interpolation).

In a supervised multi-camera training method, although SCA should account for the differences between the cameras, it may leak alignment information from the ground truth into the model during finetuning. In an embodiment, a lightweight two layer residual adapter network may be fine tuned on top of self-supervised base demosaicing model, while freezing the parameters of the base model. This enables an adapter to learn the color space transformation from the burst camera to the ground truth camera, while its limited capacity discourages it from learning undesirable spatial transformations.

Although fully supervised training may be performed with access to noise-free, demosaiced ground truth images that are aligned with a reference image, the images may be difficult to obtain due hardware limitations, as many sensors have CFAs.

Figure 4:
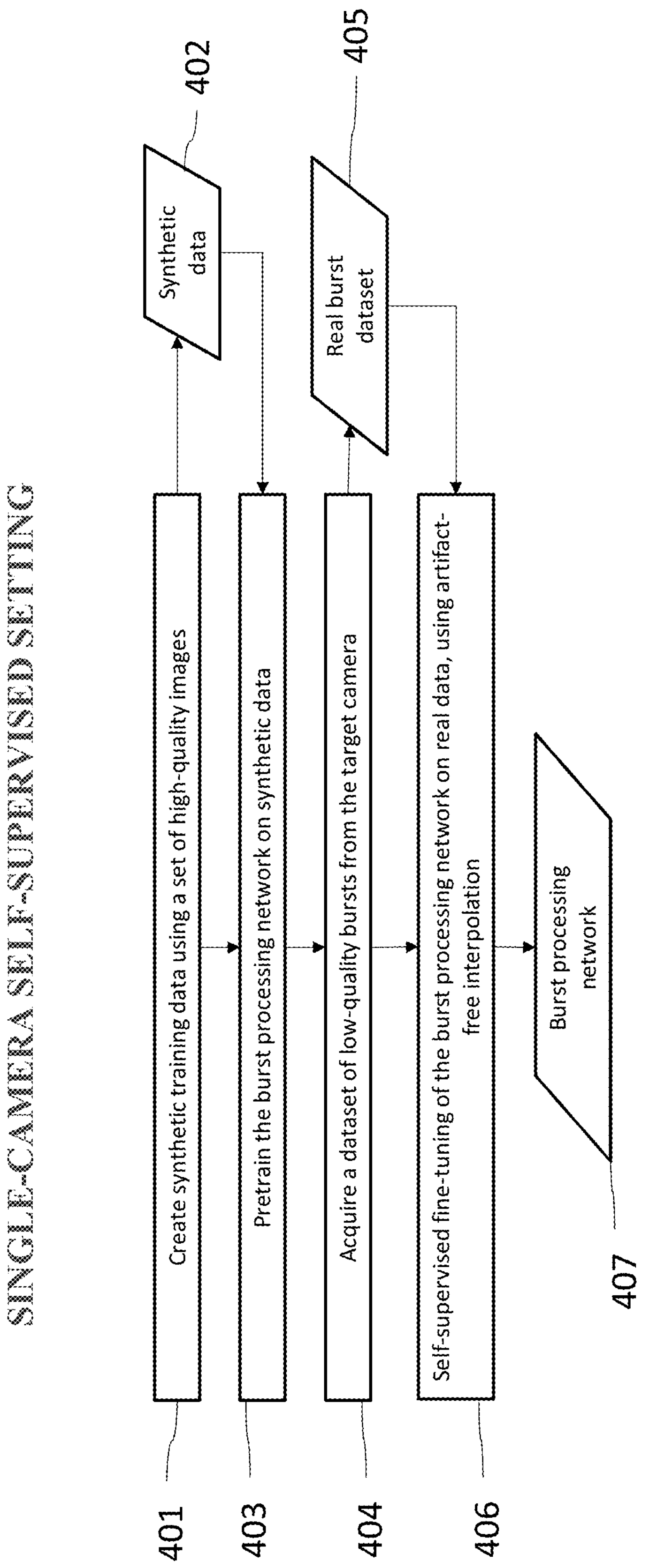
FIG. 4 illustrates an example method of training a burst processing network using a single-camera self-supervised setting, according to one or more embodiments.

FIG. 4 illustrates an example method of training a burst processing network using a single-camera self-supervised setting, according to an embodiment. In the context of a single-camera setup, self-supervised learning algorithms may leverage the structure or properties of the data to create training signals.

According to an embodiment, at operation 401, the method includes creating synthetic training data using a set of high-quality images. At operation 403, the method includes providing synthetic data (e.g., 402) to the burst processing network to pretrain the burst processing network. At operation 404, the method includes acquiring a dataset of low-quality bursts from a target camera. At operation 405, the method includes providing a real burst dataset to the burst processing network. At operation 406, the method includes performing self-supervised fine-tuning of the burst processing network on real data, using artifact-free interpolation (e.g., implicit interpolation).

According to an embodiment, frames from a burst may differ by small motions which can provide color samples at locations that are missing in the reference frame, and can be leveraged if the alignments are estimated accurately. To leverage bursts for self-supervised training, one frame may be held out from the burst as a target frame, T, which is not used as an input to the model. A self-supervised method may minimize a reconstruction error between the observed color samples in the target frame, and an aligned demosaiced output from the model. For a model with a grid based output: $\mathcal{L}_{grid}=\|M(T-W(D(\overline{e}), F_{b_1,T}))\|^2$ where $F_{b_1,T}$ is the optical flow between the reference and the target frame, the alignment is performed via the warping operation, W, and M is a mask for the observed pixels in the target frame and valid pixels after the warp. Denoising may be performed based on the noise distribution having zero mean. The position of pixels in the demosaiced image may not align with the position of pixels on the target image. According to an embodiment, the difference between the values in the target image and interpolated values from the demosaiced image may be minimized. Related art interpolation methods may provide suboptimal results, and it may be useful to allow the model to learn an interpolation operation.

Using a coordinate-based decoder, the self-supervised loss may be modified to: $\mathcal{L}_{coord}=\|M(T-F(\bar{e}, F_{b_1,T}))\|^2$, which replaces the warping operation with the coordinate-based output that is directly produced by the model.

Figure 5:
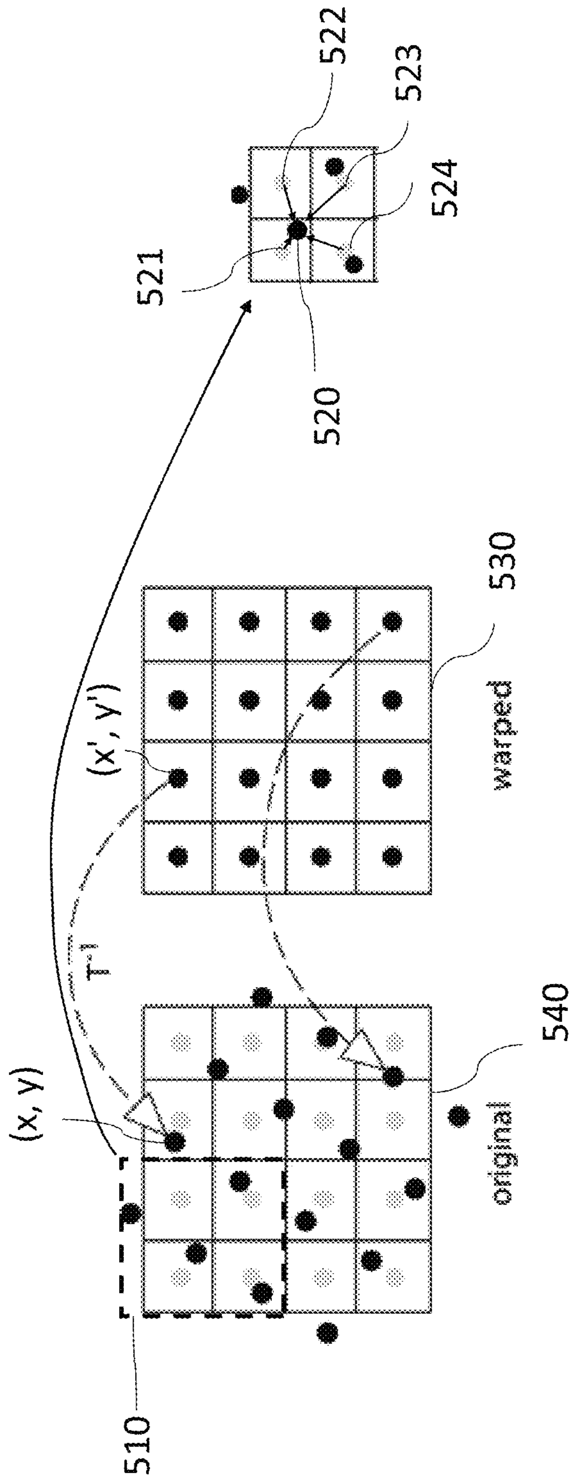
FIG. 5 illustrates an example of explicit warping, according to one or more embodiments.

FIG. 5 illustrates an example of explicit warping, according to an embodiment. When performing warping, there is a transformation that indicates which coordinate to get colors from. For each pixel (x', y') in the warped image 530, it may be mapped back to the original image 540, obtaining image coordinates (x, y). Explicit interpolation may refer to, since (x, y) falls on non-integer pixel coordinates, computing the value at (x, y) using a weighted average of neighboring pixel values.

Implicit interpolation refers to directly passing a non-integer (x, y) to a neural network to get a color at (x, y), and placing the obtained color from 2 or 3 in the integer pixel location (x', y') in the warped image.

When performing warping, it is unlikely that the warping lands exactly on integer coordinates. When it lands on non-integer coordinates, an interpolation is performed to identify the color. Pixel 520 illustrates an example of bilinear interpolation of area 510. Pixel 520 is closer to the top left but it is in between the four pixels 521, 522, 523, 524. Thus, pixel 520 is a linear blend of the colors of those four pixels. Performing this interpolation may result in more blur. Thus, implicit interpolation may be used to reduce blur.

FIGS. 6A, 6B, 6C, and 6D illustrate a burst demosaicing and denoising model architecture, and a self-supervised network, according to one or more embodiments.

Figure 6A:
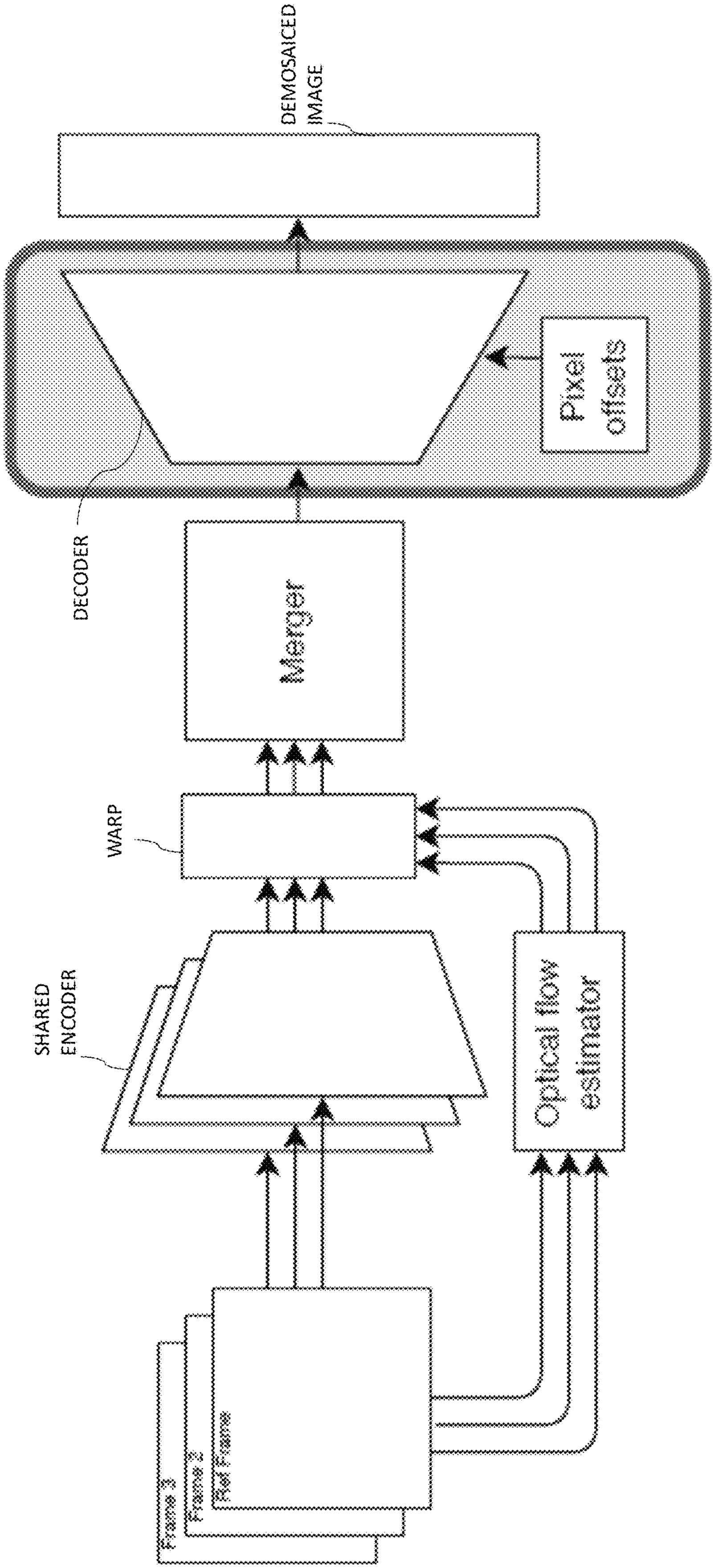
FIGS. 6A, 6B, 6C, and 6D illustrate a burst demosaicing and denoising model architecture, and framework, according to one or more embodiments.

FIG. 6A illustrates an example that uses pixel offsets to allow outputs with different alignments. At inference, zero pixel offsets can be provided to output a demosaiced image that is aligned with a reference image. According to an embodiment, FIG. 6A illustrates a burst processing network (this example is for burst demosaicing, but may be used in other applications). Each frame is encoded with a convolutional encoder. The frames are aligned to a chosen reference frame in the burst. Each image gets processed with a shared encoder. The encoder features are warped to the reference frame and merged together into a single feature map. This feature map is decoded into a final output image. During training, the decoder takes in pixel offsets to warp the output image into a target frame of reference.

Using a burst of N noisy RAW images $$\{b_i\}_{i=1}^N,$$

the model encodes each frame independently using a convolutional encoder $$E\left(\{b_i\}_{i=1}^N\right)$$

to obtain embeddings $$\{e_i\}_{i=1}^N.$$

The first frame is considered the reference frame, and the final demosaiced image will be aligned with it. Frame alignments are estimated by computing the optical flow between each frame, and the reference frame. Aligned embeddings $$\{\hat{e}_i\}_{i=1}^N$$

are obtained by warping the embeddings $$\{e_i\}_{i=1}^N$$

using the optical flow, and bilinear interpolation. Every frame in the burst may be merged using an attention based fusion module $$Z\left(\{e_i\}_{i=1}^N\right)$$

to produce the merged embeddings $\bar{e}$. The merged embeddings are decoded into a grid-based image using a convolutional decoder $\hat{y}=D(\bar{e})$.

According to an embodiment, a coordinate-based decoder $\hat{y}(c)=F(\bar{e}, c)$ may be used which outputs the color values for a set of image coordinates c. The coordinate-based decoder may enable the model to learn a suitable interpolator for providing image intensities for pixel positions that are not aligned with the image grid of the reference frame. To obtain a demosaiced image that is aligned with the reference frame, a zero flow field can be used as the coordinate query. The architecture, and the examples of the decoder are illustrated in FIGS. 6B and 6C.

Figure 6C:
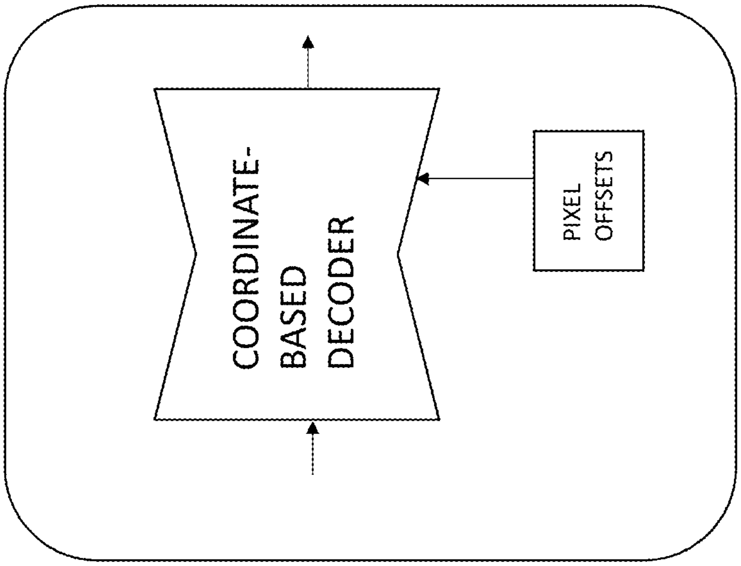
Figure 6B:
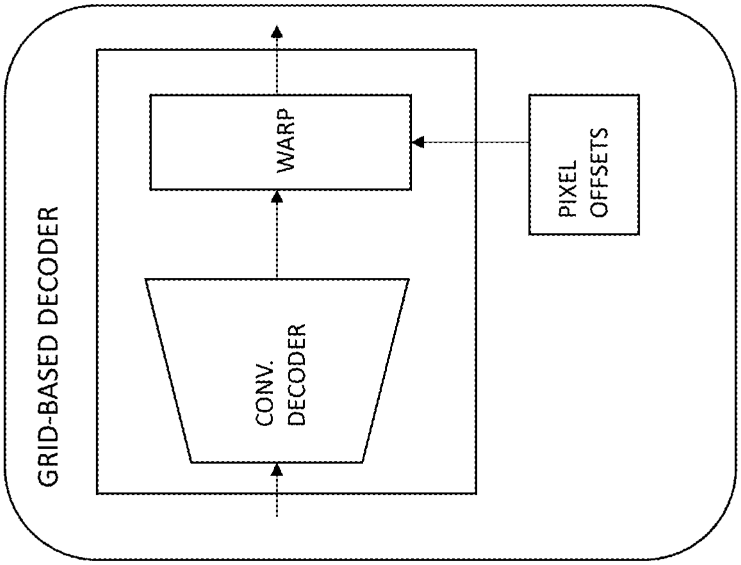

FIG. 6B illustrates a grid-based decoder for a grid-based burst demosaicing and denoising model. FIG. 6C illustrates a coordinate-based decoder for a burst demosaicing and denoising model. According to an embodiment, a self-supervised may be used for both the grid-based model, and the coordinate-based model. A lightweight adapter network for finetuning on multi-camera datasets that mitigates the leakage of alignment information into the model may also be used.

FIGS. 6B and 6C illustrate example embodiments of the decoder. As illustrated in FIG. 6B, a grid-based decoder provides aligned images by warping a grid-based demosaiced image. According to an embodiment illustrated in FIG. 6B, a grid-based decoder using explicit interpolation is illustrated. Grid-based decoders first decode an image into a 2D array of pixels. The image is high quality but is aligned to the reference frame and not the target. The image is warped explicitly to align to the target. The image may be blurred due to the warping.

As illustrated in 6C, the coordinate-based decoder directly conditions the decoder to produce aligned images. According to an embodiment illustrated in FIG. 6C, a decoder using implicit interpolation is illustrated. A coordinate-based decoder uses implicit interpolation to return decoded image values for any warped 2D coordinate. Thus, using a coordinate-based decoder, an image is not blurred from the interpolation.

Figure 6D:
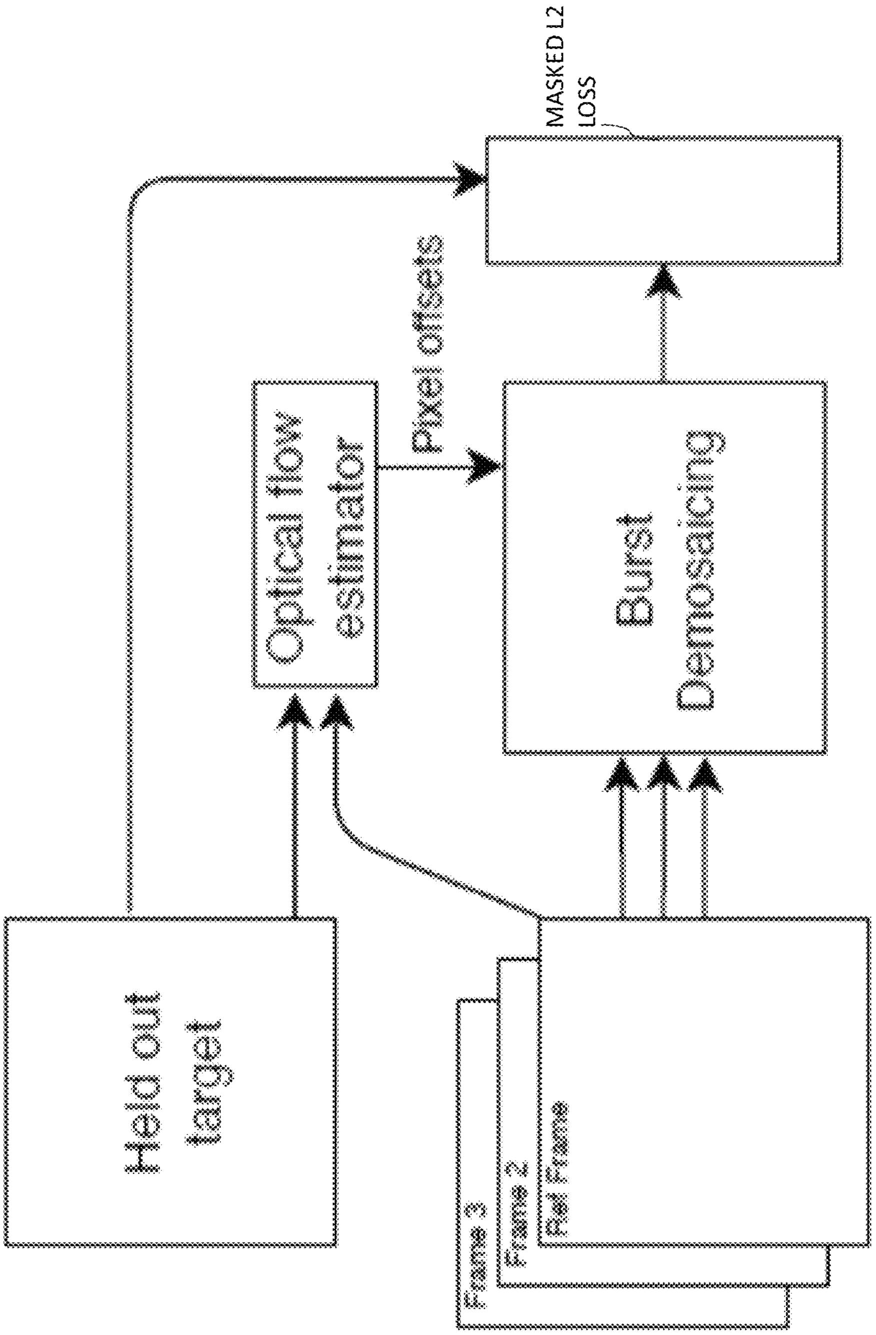

FIG. 6D illustrates framework in which one of the frames are held out for supervision. The elements discussed below with respect to FIG. 6D may be used in a self-supervised single-camera method and/or a supervised multi-camera method.

According to an embodiment, FIG. 6D illustrates identifying a loss computation between an aligned output and a held-out burst frame. If using a self-supervised training method, the input images include a burst of images from a single camera, with a held out frame. In self-supervised training, a burst is taken by a single camera, and one frame is held out from the burst of images for supervision. If a burst includes N frames, then N−1 frames may be input to a burst processing network 202 and one frame is held out for supervision. Similar computation may be done in a supervised case between an aligned output and target camera image. For example, if using a supervised multi-camera method, the held out frame may be an additional quality image taken from another camera.

Figure 7:
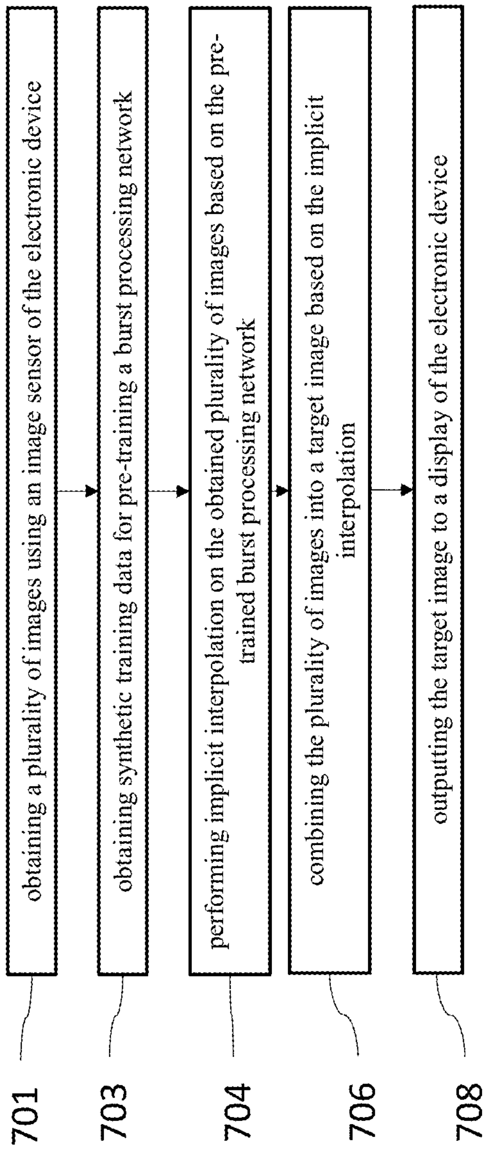
FIG. 7 illustrates an example method of outputting a target image to a display, according to one or more embodiments.

FIG. 7 illustrates an example method of outputting a target image to a display, according to an embodiment. At operation 701, the method includes obtaining a plurality of images using an image sensor of the electronic device. At operation 703, the method includes obtaining synthetic training data for pre-training a burst processing network. At operation 704, the method includes performing implicit interpolation on the obtained plurality of images based on the pre-trained burst processing network. At operation 706, the method includes combining the plurality of images into a target image based on the implicit interpolation. At operation 708, the method includes outputting the target image to a display of the electronic device.

The embodiments have been described above and illustrated in terms of blocks, as shown in the drawings, which carry out the described function or functions. These blocks may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the embodiments listed below:

(1) A method, performed by at least one processor of an electronic device, the method comprising: obtaining a plurality of images using an image sensor of the electronic device; obtaining synthetic training data for pre-training a burst processing network; performing implicit interpolation on the obtained plurality of images based on the pre-trained burst processing network; combining the plurality of images into a target image based on the implicit interpolation; and outputting the target image to a display of the electronic device (2) The method according to feature (1), in which the performing implicit interpolation comprises passing a non-integer coordinate to obtain a color.

(3) The method according to feature (1), in which the performing implicit interpolation comprises, for each of the plurality of images, decoding image values for each two-dimensional coordinate.

(4) The method according to feature (1), in which the obtaining the plurality of images comprises obtaining the plurality of images using a plurality of cameras.

(5) The method according to feature (1), in which the obtaining the plurality of images comprises capturing the plurality of images using a single camera.

(6) The method according to feature (1), in which the performing implicit interpolation comprises fine tuning the burst processing network using self-supervised loss computation.

(7) The method according to feature (1), in which the performing implicit interpolation comprises fine tuning the burst processing network using supervised loss computation.

(8) An electronic device comprising: an image sensor; a display; a memory configured to store instructions; and at least one processor configured to execute the instructions to cause the electronic device to: obtain a plurality of images using the image sensor of the electronic device; obtain synthetic training data for pre-training a burst processing network; perform implicit interpolation on the obtained plurality of images based on the pre-trained burst processing network; combine the plurality of images into a target image based on the implicit interpolation; and output the target image to the display of the electronic device.

(9) The electronic device according to feature (8), in which the at least one processor is further configured to perform the implicit interpolation by passing a non-integer coordinate to obtain a color.

(10) The electronic device according to feature (8), in which the at least one processor is further configured to, for each of the plurality of images, decode image values for each two-dimensional coordinate.

(11) The electronic device according to feature (8), in which the at least one processor is further configured to obtain the plurality of images using a plurality of cameras.

(12) The electronic device according to feature (8), in which the at least one processor is further configured to obtain the plurality of images using a single camera.

(13) The electronic device according to feature (8), in which the at least one processor is further configured to perform the implicit interpolation by fine tuning the burst processing network using self-supervised loss computation.

(14) The electronic device according to feature (8), in which the at least one processor is further configured to perform the implicit interpolation by fine tuning the burst processing network using supervised loss computation.

(15) A non-transitory computer readable medium having instructions stored therein, which when executed by a processor cause the processor to execute a method comprising: obtaining a plurality of images using an image sensor of an electronic device; obtaining synthetic training data for pre-training a burst processing network; performing implicit interpolation on the obtained plurality of images based on the pre-trained burst processing network; combining the plurality of images into a target image based on the implicit interpolation; and outputting the target image to a display of the electronic device.

(16) The non-transitory computer readable medium according to feature (15), in which the performing implicit interpolation comprises passing a non-integer coordinate to obtain a color.

(17) The non-transitory computer readable medium according to feature (15), in which the performing implicit interpolation comprises, for each of the plurality of images, decoding image values for each two-dimensional coordinate.

(18) The non-transitory computer readable medium according to feature (15), in which the obtaining the plurality of images comprises obtaining the plurality of images using a plurality of cameras.

(19) The non-transitory computer readable medium according to feature (15), in which the obtaining the plurality of images comprises capturing the plurality of images using a single camera.

(20) The non-transitory computer readable medium according to feature (15), in which the performing implicit interpolation comprises fine tuning the burst processing network using self-supervised loss computation.

What is claimed is:

1. A method, performed by at least one processor of an electronic device, the method comprising:

obtaining a plurality of images using an image sensor of the electronic device;

obtaining synthetic training data for pre-training a burst processing network;

performing implicit interpolation on the obtained plurality of images based on the pre-trained burst processing network;

combining the plurality of images into a target image based on the implicit interpolation; and outputting the target image to a display of the electronic device, wherein the performing implicit interpolation comprises passing a non-integer coordinate to obtain a color.

2. The method of claim 1, wherein the performing implicit interpolation comprises, for each of the plurality of images, decoding image values for each two-dimensional coordinate.

3. The method of claim 1, wherein the obtaining the plurality of images comprises obtaining the plurality of images using a plurality of cameras.

4. The method of claim 1, wherein the obtaining the plurality of images comprises capturing the plurality of images using a single camera.

5. The method of claim 1, wherein the performing implicit interpolation comprises fine tuning the burst processing network using self-supervised loss computation.

6. The method of claim 1, wherein the performing implicit interpolation comprises fine tuning the burst processing network using supervised loss computation.

7. An electronic device comprising:

an image sensor;

a display;

a memory configured to store instructions; and at least one processor configured to execute the instructions to cause the electronic device to:

obtain a plurality of images using the image sensor of the electronic device;

obtain synthetic training data for pre-training a burst processing network;

perform implicit interpolation on the obtained plurality of images based on the pre-trained burst processing network;

combine the plurality of images into a target image based on the implicit interpolation; and output the target image to the display of the electronic device, wherein the at least one processor is further configured to perform the implicit interpolation by passing a non-integer coordinate to obtain a color.

8. The electronic device of claim 7, wherein the at least one processor is further configured to, for each of the plurality of images, decode image values for each two-dimensional coordinate.

9. The electronic device of claim 7, wherein the at least one processor is further configured to obtain the plurality of images using a plurality of cameras.

10. The electronic device of claim 7, wherein the at least one processor is further configured to obtain the plurality of images using a single camera.

11. The electronic device of claim 7, wherein the at least one processor is further configured to perform the implicit interpolation by fine tuning the burst processing network using self-supervised loss computation.

12. The electronic device of claim 7, wherein the at least one processor is further configured to perform the implicit interpolation by fine tuning the burst processing network using supervised loss computation.

13. A non-transitory computer readable medium having instructions stored therein, which when executed by a processor cause the processor to execute a method comprising:

obtaining a plurality of images using an image sensor of an electronic device;

obtaining synthetic training data for pre-training a burst processing network;

performing implicit interpolation on the obtained plurality of images based on the pre-trained burst processing network;

combining the plurality of images into a target image based on the implicit interpolation; and outputting the target image to a display of the electronic device, wherein the performing implicit interpolation comprises passing a non-integer coordinate to obtain a color.

14. The non-transitory computer readable medium of claim 13, wherein the performing implicit interpolation comprises, for each of the plurality of images, decoding image values for each two-dimensional coordinate.

15. The non-transitory computer readable medium of claim 13, wherein the obtaining the plurality of images comprises obtaining the plurality of images using a plurality of cameras.

16. The non-transitory computer readable medium of claim 13, wherein the obtaining the plurality of images comprises capturing the plurality of images using a single camera.

17. The non-transitory computer readable medium of claim 13, wherein the performing implicit interpolation comprises fine tuning the burst processing network using self-supervised loss computation.

* * * * *